Nov. 25, 1969   D. J. HOLTHOFER   3,479,897
VARIABLY PRELOADED BALL NUT AND SCREW ASSEMBLY
Filed Aug. 16, 1967   2 Sheets-Sheet 1
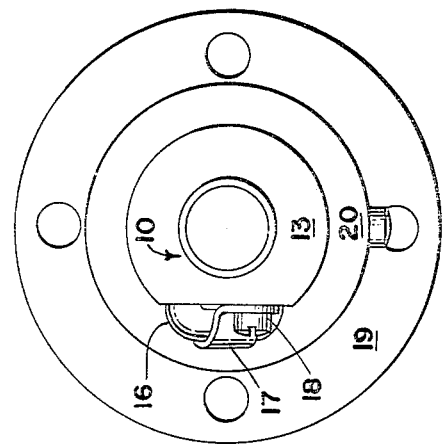
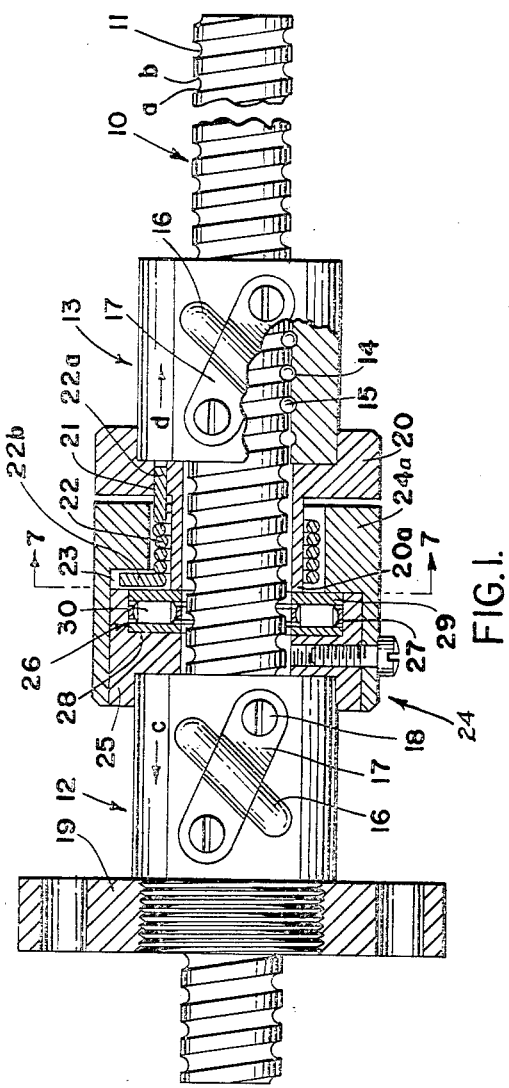
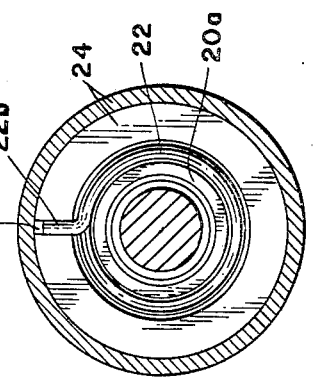
INVENTOR.
DONALD J. HOLTHOFER
BY
Learman & McCulloch Nov. 25, 1969  D. J. HOLTHOFER  3,479,897
VARIABLY PRELOADED BALL NUT AND SCREW ASSEMBLY
Filed Aug. 16, 1967  2 Sheets-Sheet 2
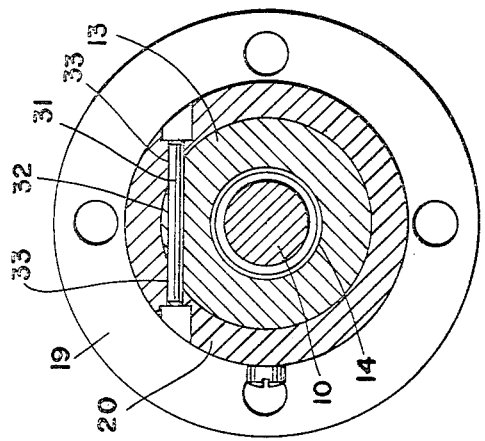
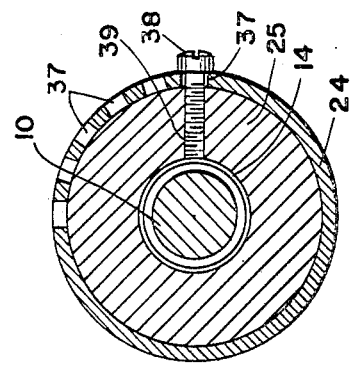
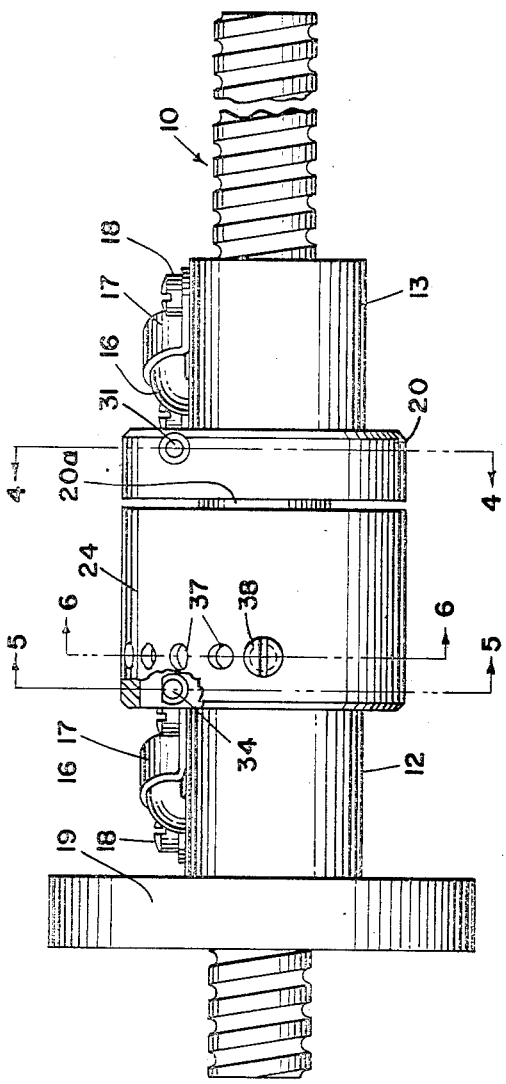
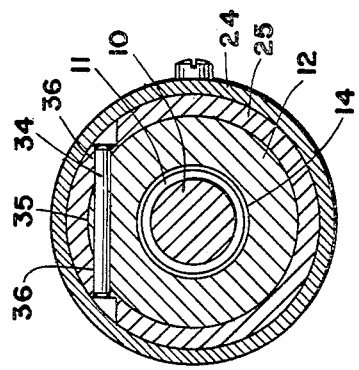
INVENTOR.
DONALD J. HOLTHOFER
BY

United States Patent Office 3,479,897
Patented Nov. 25, 1969

---

3,479,897
VARIABLY PRELOADED BALL NUT AND SCREW ASSEMBLY
Donald J. Holthofer, Northridge, Calif., assignor to Saginaw Products Corporation, Saginaw, Mich., a corporation of Michigan
Filed Aug. 16, 1967, Ser. No. 661,068
Int. Cl. F16h 55/18
U.S. Cl. 74—441                9 Claims

ABSTRACT OF THE DISCLOSURE

A preloaded ball nut and screw assembly wherein a pair of axially spaced apart nuts are mounted on a ball screw and connected by a torsion spring. A rotatable spring mount on one of the nuts may be secured in various selected rotary positions to vary the preload force.

---

This invention relates to devices for translating linear motion into rotary motion or vice versa and particularly to pre-loaded devices of this character wherein a pair of preloaded ball nuts are employed on a ball screw to preload both sides of the helical groove thereof.

Preloaded ball nut and screw assemblies employing two nuts in tandem relation on the ball screw and wherein recirculating balls are provided under a preload to eliminate lash between the screw and the nut have found wide application in industry for such purposes as the precise positioning of machine parts and workpieces. In such assemblies it is economical to use rolled screws, which are less accurate than ground screws, and accordingly it is necessary that the preloading be reliably and efficiently accomplished.

One of the prime objects of the invention is to provide a versatile and compact assembly of the character described which permits the variation of the preload utilized over a selected range and renders it possible for the assembly to meet specific stiffness requirements and maintain the preload control necessary during the useful life of the device despite wear to achieve increased ball bearing screw assembly life predictions.

A further object of the invention is to provide an assembly of this character in which only a pair of tandemly connected nuts having internal helical grooves are utilized in connection with a single screw member and the relationship between the rotation of the screw and the nut travel is dependably constant since the movement relationship depends on only one set of components.

Another object of the invention is to provide a device of the character described wherein a torsion spring connects the tandemly arranged nuts and provides a preloading spring stroke which will easily accommodate the widest possible variations which may be encountered during the life of the unit.

Still a further object of the invention is to provide a preloaded ball nut and screw assembly of the character mentioned wherein, contrary to some previous teachings, the tandemly arranged nuts employed are permitted to relatively rotate and bearing means is provided to facilitate that rotation which compensates for variations which effect either an increase or decrease in lead.

Other objects and advantages of the invention will be pointed out specifically or will become apparent from the following description when it is considered in conjunction with the claims and the accompanying drawings, in which:

FIGURE 1 is a side elevational view which is partly in section to illustrate operating components of the assembly;
FIGURE 2 is a right end elevational view thereof;
FIGURE 3 is an exterior side elevational view;
FIGURE 4 is a transverse, sectional view taken on the line 4—4 of FIGURE 3;
FIGURE 5 is a transverse, sectional view taken on the line 5—5 of FIGURE 3;
FIGURE 6 is a transverse, sectional view taken on the line 6—6 of FIGURE 3; and
FIGURE 7 is a transverse, sectional view taken on the line 7—7 of FIGURE 1.

Referring now more particularly to the drawings, wherein I have shown a preferred embodiment of the invention only, a numeral 10 is employed to generally identify the ball screw component of the assembly, which is provided with a helical ball groove 11 having opposed side walls $a$ and $b$. Ball nuts, generally designated 12 and 13, are provided in axially spaced apart tandem arrangement on the screw 10 and have complementary internal helical grooves 14 in the usual manner. The recirculating balls 15, which are accommodated between the groove 11 in the screw 10 and the helical grooves 14 in the nuts 12 and 13, are recirculated through the usual return tubes 16 which may be secured to the nuts by clamp plates 17 utilizing screws 18.

In devices of this character either the screw 10 or the nut assembly may be connected to the power source when the device is in use. Most frequently, it is the screw which is rotated to cause the nuts to travel linearly thereon. Accordingly, I have shown a mounting plate 19 as secured to the nut 12 and which may connect the nut 12 to a slide or other device which is to move linearly. Alternatively, of course, it may be the nuts which are revolved while held against axial movement to bring about lineal travel of the screw component.

Secured to the nut 13 is a spring mount member 20 which has a generally axial opening 21 for receiving one end 22a of a torsion spring 22 which surrounds a tubular projection sleeve portion 20a of the spring mount 20. Secured to the nut 12 is a spring mount 24 including spring housing member 24a and bearing housing 25. The other radially extending end 22b of spring 22 is received in a radial groove 23 provided in a spring housing member 24a which is movable to various selected rotary positions, as will later appear, to vary the preload to be exerted by spring 22. Provided on the nut 12 and revolvably supporting the member 24a is a bearing housing 25 which houses a needle thrust bearing generally designated 26 within a recess 27 provided therein, as shown in FIGURE 1. The bearing 26 includes races 28 and 29 and the needle or roller bearings 30 which are retained thereby, and it should be observed that the end of the sleeve portion 20a of spring mount 20 is in abutting engagement with the race 29.

As FIGURE 4 indicates, the spring mount 20 at the right end of the assembly is fixed to the nut 13 by a pin 31 which extends from an opening 32 provided in the nut 13 into openings 33 provided in the spring mount 20. At the opposite end of the device, and as FIGURE 5 indicates, the bearing housing member 25 is fixed to the nut 12 by a pin 34 extending from an opening 35 in the nut 12 into openings 36 provided in the member 25.

The spring mount housing 24a, it will be observed (see FIGURE 3), includes a series of circumferentially spaced openings 37, and a screw member 38 is adapted to extend through one of the openings 37 into a threaded opening 39 provided in the nut 12, as shown in FIGURE 6. When the screw 38 is withdrawn, plainly the spring mount housing 24a is rotatable on the bearing housing member 25 to align any one of the openings 37 with the opening 39 and it is in this way that the desired preloading torque to be applied by the spring 22 is selected. The openings 37 are so spaced that, when the device is assembled and a particular opening 37 is aligned be applied by the spring 22 to achieve a predetermined and controlled preload.

In operation, once the device is assembled in the manner indicated, with the screw 38 extending through a selected opening 37 to anchor the spring mount housing 24a in a selected position, the spring 22 is in a stressed position, causing it to want to relatively rotate the members 20 and 25 and nuts 12 and 13 in a direction to force the nuts 12 and 13 axially apart in the directions c and d, for instance (see FIGURE 1). In view of the presence of bearing 26, the very slight rotation which occurs is not impeded when the preload is applied, and the tandemly arranged nuts 12 and 13 are able to efficiently exert a preloading force in opposite directions loading opposite faces or sides a and b of the screw groove 11. The relative rotation may be in the nature of several seconds angularly. So that a considerable range of preloading is possible, the spring 22 is of somewhat greater diameter than the sleeve portion 20a of spring mount 20 and is free to radially contract as necessary. The torsion spring by its very nature is able to provide a large deflection range which permits the application of a wide range of predetermined preloading torques at essentially the efficiency of the ball screw and permits the device to compensate for wear of the parts over an extended life of use.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. A preloaded ball nut and screw assembly comprising: a ball screw having a ball accommodating helical groove; a pair of axially spaced nuts on said screw having internal helical grooves formed complementally to the screw groove to provide ball races; a train of balls in each ball race; confronting spring mounts on each nut; and a torsion spring connected between said spring mounts to preload the nuts in a direction to preload the balls of said trains.

2. The combination defined in claim 1 in which roller bearing means surrounds said screw between said spring mounts to facilitate relative rotation thereof.

3. The combination defined in claim 1 in which one of said spring mounts is mounted on one of said nuts for movement to various positions in which different preloading forces are developed by the spring.

4. The combination defined in claim 3 in which said movable spring mount is rotatable relative to the nut on which it is mounted and has a series of circumferentially spaced apart openings therein; and a securing member is adapted to extend through a selected on of said openings to fix said movable spring mount in a selected rotary position.

5. The combination defined in claim 4 in which said movable spring mount comprises an outer casing housing said spring.

6. A preloaded ball nut and screw assembly comprising a ball screw having a ball accomodating helical groove with opposite side walls; a pair of nuts on said screw having internal helical grooves formed similarly to the screw groove to provide ball races; balls for said races; resilient means mounted to preload the nuts axially and force the balls to preload both sides of the screw groove; each nut including support means for receiving said resilient means, and at least one of said support means being rotatable; and means for securing said rotatable support means in a selected rotary position to vary the preload exerted by said resilient means.

7. The combination defined in claim 6 in which said resilient means comprises a torsion spring connected between said nuts; and said movable means comprises a spring mount movable to selected rotary position on one of said nuts.

8. The combination defined in claim 7 in which a plurality of circumferentially spaced openings are provided in said spring mount and a securing member is fixed in a selected one of said openings to hold said spring mount in the desired rotary position.

9. A method of setting a preloaded ball nut and screw assembly wherein a screw having a ball accommodating helical groove extends through a pair of nuts having complementary helical grooves with recirculating balls therein, and a torsion spring connects spring mounts on the nuts in a manner to preload the balls comprising: rotating one of said spring mounts relative to the other and securing it in selected rotary positions.

References Cited

UNITED STATES PATENTS

| 2,385,194 | 9/1945 | Carroll | 74—441 |
| 2,842,007 | 7/1958 | Brant | 74—441 |
| 2,919,596 | 1/1960 | Kuehl | 74—441 |
| 3,124,969 | 3/1964 | Grabowski et al. | 74—441 |
| 3,186,249 | 6/1965 | Lazenberger | 74—409 |

LEONARD H. GERIN, Primary Examiner

U.S. Cl. X.R.

74—409, 424.8